United States Patent [19]

Bozarth, Jr. et al.

[11] Patent Number: 4,592,002

[45] Date of Patent: May 27, 1986

[54] METHOD OF DIGITAL TEMPERATURE COMPENSATION AND A DIGITAL DATA HANDLING SYSTEM UTILIZING THE SAME

[75] Inventors: Theodore B. Bozarth, Jr., Perkasie; Arthur M. Olsen, Pennsburg; Ronald H. Rowlands, Collegeville, all of Pa.

[73] Assignee: Honeywell Inc., Minneapolis, Minn.

[21] Appl. No.: 561,252

[22] Filed: Dec. 13, 1983

[51] Int. Cl.⁴ .............................................. G06F 15/20
[52] U.S. Cl. ................................... 364/571; 364/557; 73/708; 340/347 CC
[58] Field of Search ............... 364/558, 556, 557, 571; 340/347 CC; 73/708

[56] References Cited

U.S. PATENT DOCUMENTS

| | | | |
|---|---|---|---|
| 4,418,392 | 11/1983 | Hata | 364/571 |
| 4,444,055 | 4/1984 | Balkanli | 340/347 CC |
| 4,464,725 | 8/1984 | Briefer | 364/571 |
| 4,468,968 | 9/1984 | Kee | 73/708 |
| 4,479,190 | 10/1984 | Takai et al. | 364/571 |

FOREIGN PATENT DOCUMENTS

WO82/03121  9/1982  PCT Int'l Appl. ................ 364/571

*Primary Examiner*—Parshotam S. Lall
*Attorney, Agent, or Firm*—Mitchell J. Halista; Trevor B. Joike

[57] ABSTRACT

A method of digital temperature compensation uses a digital temperature compensation word to produce a digital word modification of a digital input to a temperature sensitive digital to analog converter hereinafter converter. The method includes the steps of sensing the temperature affecting the converter to produce a digital temperature representation which is used by a digital computer to produce an output in accordance with a characterization equation in the form of Output=f(D, M) where D=digital data and M=f(temperature). The temperature stability of the converter is affected by the temperature stability of a reference voltage circuit used in the converter and having a voltage reference diode. A compensation circuit uses a temperature sensor in the form of a second diode, which is thermally coupled to the reference diode, and a tracking type analog-to-digital converter for converting an analog signal. The output of the analog-to-digital converter is supplied as a digital word to a digital computer system which uses the digital word to modify a digital input to the converter. The computer system includes a non-volatile memory in which is stored a characterization equation which describes the performance of the converter as a function of the digital output signal from the computer and the digital representation of temperature from the analog-to-digital converter. Thus, the output from the digital-to-analog converter is compensated for the effect of temperature on the converter.

18 Claims, 2 Drawing Figures

METHOD OF DIGITAL TEMPERATURE COMPENSATION AND A DIGITAL DATA HANDLING SYSTEM UTILIZING THE SAME

BACKGROUND OF THE INVENTION

Field of the Invention

This invention relates to a method and apparatus for digital data handling. More specifically, the present invention is directed to a method and apparatus for digital data handling to provide a digital temperature compensation.

SUMMARY OF THE INVENTION

An object of the present invention is provided an improved method and apparatus for digital data handling to provide a digital temperature compensation.

In accomplishing this and other objects there has been provided, in accordance with the present invention a method for digital temperature compensation of a digital analog converter system including the steps of sensing a temperature affecting the digital system, converting the sensed temperature into a digital temperature representation, supplying the digital temperature representation to a digital computer to be used in computing a digital output from the computer in accordance with a characterization equation which is a function of the digital temperature representation and supplying the digital output as a digital input to the digital system and a system utilizing the method uses a memory for storing the characterization equation, a digital computer means for computing an output in accordance with the characterization equation and a temperature compensation means for providing digital representation of a temperature affecting the digital system to the digital computer means to be used in computing the output.

BRIEF DESCRIPTION OF THE DRAWING

A better understanding of the present invention may be had when the following detailed description is read in connection with the accompanying drawings, in which.

DESCRIPTION OF THE PREFERRED EMBODIMENT

Figure 1:
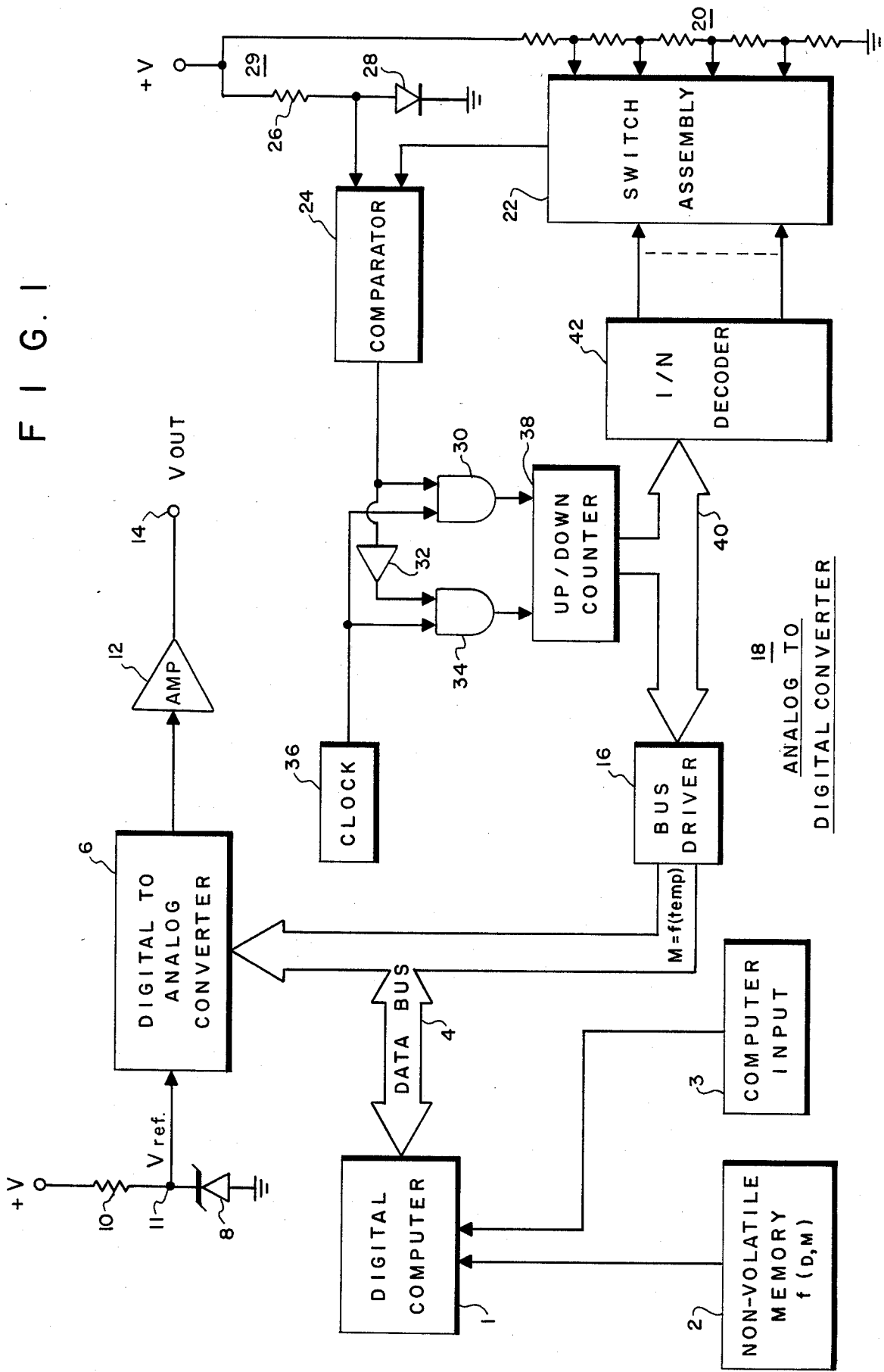
FIG. 1 is a block diagram of a digital data handling apparatus embodying an example of the present invention and FIG. 2 is a block diagram of an application of the digital data handling apparatus shown in FIG. 1 for use in a pressure transmitter.

Referring to FIG. 1 in more detail, there is shown a digital data handling apparatus having a digital computer 1 conected to a non-volatile memory 2 and a computer input 3. The computer 1 is connected by a data bus 4 to a digital-to-analog (D/A) converter 6. A reference diode 8, e.g., a Zener diode, and a resistor 10 are connected in series across a source of voltage +V and a junction 11 therebetween is connected to the digital-to-analog converter 6 to supply a voltage reference thereto. The analog output of the digital-to-analog converter 6 is supplied through an amplifier 12 to an analog output terminal 14. The data bus 4 is also connected to a bus driver 16 which is used to apply a temperature representative digital word to the data bus 4. The digital word from the bus driver 16 is obtained from a tracking analog-to-digital (A/D) converter 18 utilizing a resistor ladder 20 connected between a source of voltage +V and a ground or common return. The output of the resistor ladder 20 is obtained from junctions between serially connected resistors forming the resistor ladder 20 and is selected by a switch assembly 22. The output of the switch assembly is connected to a first input of a signal comparator 24 to supply a first input signal thereto.

A second input signal for the comparator 24 is obtained from the junction between a resistor 26 and a temperature sensitive diode 28 in a temperature sensitive diode circuit 29. The resistor 26 and the diode 28 are connected in series between the source of voltage +V and ground. The output of the comparator 24 is connected directly to a first input of a first AND gate 30 and through a logical inverter 32 to a first input to a secnd AND gate 34. The second inputs of the first and second AND gates 30, 34 are connected to a source of clock signals 36 having a frequency which controls the updating of digital word supplied to the bus driver 16. The outputs of the first and second AND gates 30, 34 are connected to control the counting direction of an up/down counter 38. The output of the up/down counter 38 representative of a count stored in the counter 38 is connected to a data bus 40 for application as an input to a I/N decoder 42 and to the bus driver 16. The output of the I/N decoder 42 is applied to the switch assembly 22 to control its resistor ladder output selecting operation.

MODE OF OPERATION

During hot/cold testing of the digital data handling apparatus, a characterization equation, which describes the temperature performance of the digital data handling apparatus including the digital-to-analog converter 6 as a function of the digital representation of environmental temperature, i.e., Output=f(D,M) where D=digital data and M=f(temperature), is stored in the computer memory 2. The characterization equation may be developed by a testing computer using a conventional curve fitting technique using samples, e.g., four, of the output from the converter 6 for a known data word at corresponding digital representations of the test temperatures. Since the resulting characterization equation can then be used to handle the digital data input word from the computer input 3 to the computer 1 in light of the effect of temperature on the analog output of the converter 6, i.e., the output of the digital data handling apparatus, it is used to compensate the output of the digital computer 1 before the computer output is applied to the converter 6. Thus, the compensating temperature representative digital word from the digital compensation system, i.e., the A/D converter 18, is periodically sampled, e.g., once a minute, to update the temperature compensation data word, i.e., M, used in the characterization equation stored in the memory 2. The digital output from the computer 1 is accordingly modified to produce a compensated analog data output signal from the D/A converter 6. In oter words, the method of operation of the compensation system is based on converting the voltage drop across the temperature sensitive diode 28 to a digital word by the analog-to-digital converter 18. This digital word is applied to the data bus 4 for use by the digital computer 1 during the use of the stored characterization equation in handling the digital input data from the computer input 3 to modify the operation of the D/A converter 6. Thus, the analog output signal appearing at the output terminal 14 is compensated for the effect of environmental temperature on the digital handling apparatus which includes the operation of the digital-to-analog converter 6 and the reference diode 8.

The analog-to-digital converter 18 operates by using the switch assembly 22 to select a voltage from the resistor ladder 20 approximately equal to the output of the temperature sensitive diode circuit. The comparator 24 is used to sense the difference between the resistor ladder output and the temperature sensitive diode circuit 29 and to change its output signal polarity as a representation of the identity of the higher comparator input signal. The comparator output signal is used to operate one of the AND gates 30, 34 depending on its polarity which, in turn, operates the counting direction of the counter 38. Since the output of the counter 38 is decoded by the decoder 42 and is used to control the setting of the switching assembly 22, the comparator output signal is effective to produce a variation in the output of the resistor ladder 20 in a direction to match the output of the temperature sensitive diode circuit 29. Thus, the count output of the counter 38 is a digital word that represents the temperature induced variations on the output of the temperature sensitive diode circuit 29. The output of the counter is, accordingly, supplied over bus 16 as the digital word M to be used in the computation of the digital output from the digital computer 1.

Figure 2:
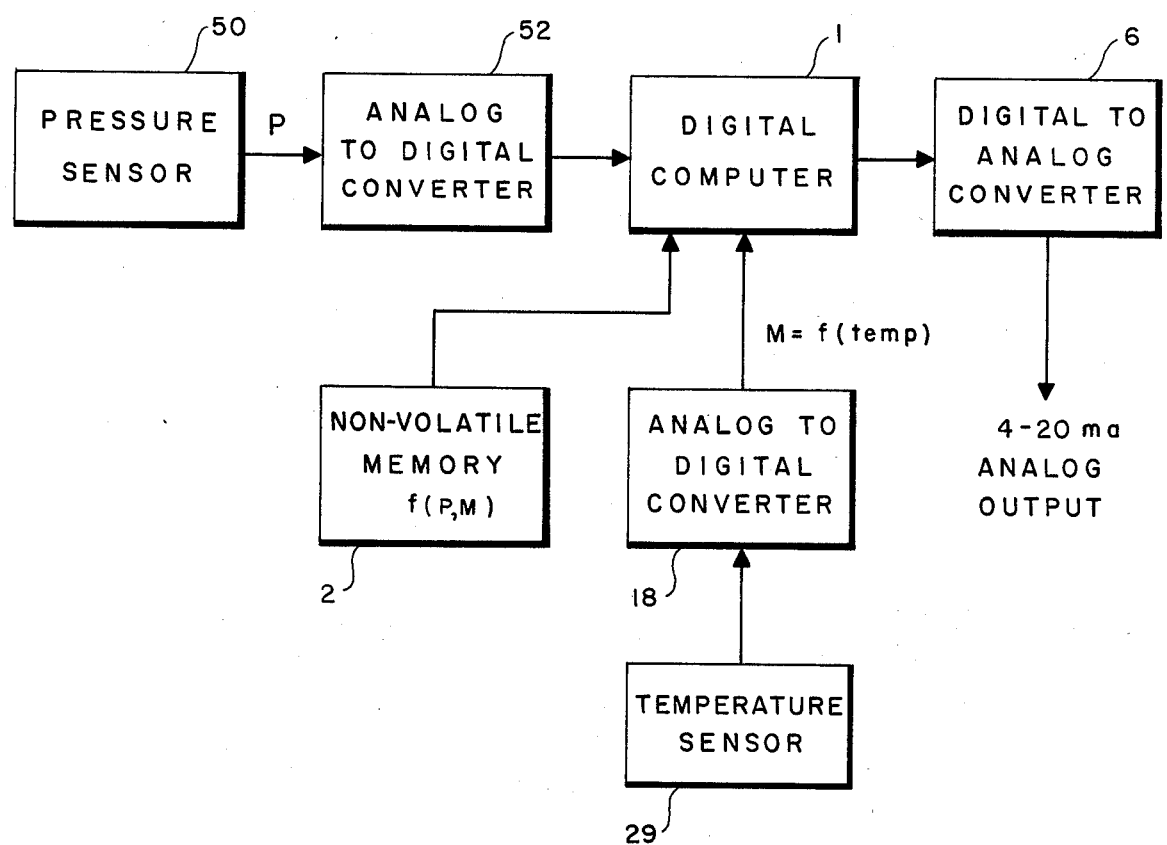

In FIG. 2, there is shown a block diagram of a digital data handling apparatus embodying the method of the present invention for use in a pressure transmitter application. In this application, the data input to the digital computer 1 is obtained from a pressure sensor 50 having its analog output converted by an analog-to-digital converter 52 to a digital signal. The characterization equation stored in the memory 2 is then used by the digital computer 1 to modify the digital output representative of the detected pressure before the digital signal is converted by the digital-to-analog converter 6 to an analog signal in a suitable analog signal range as used in the process control industry, e.g., 4 to 20 ma.

Accordingly, it may be seen, that there has been provided, in accordance with the present invention an improved method and apparatus for digital data handling to provide a digital temperature compensation.

The embodiments of the invention in which an exclusive property or privilege is claimed are defined as follows:

1. A method for digital temperature compensation of a digital-to-analog converter system comprising the steps of
   sensing a temperature affecting the digital data handling system,
   converting the sensed temperature into a digital temperature representation,
   supplying the digital temperature representation to a digital computer for use by the digital computer in computing a digital output in accordance with a characterization equation which is at least partly a function of the digital temperature representation and
   applying the digital output as a digital input to the digital-to-analog converter system.

2. A method as set forth in claim 1 wherein and analog output from the converter is within the range of 4 to 20 ma.

3. A method as set forth in claim 1 wherein the sensing of a temperature includes the step of sensing a temperature of a reference diode supplying a reference voltage in the digital-to-analog converter system.

4. A method as set forth in claim 3 wherein the converting of the sensed temperature includes the step of converting a sensed temmperature of the reference diode into the digital temperature representation.

5. A method as set forth in claim 4 wherein the sensing of the temperature of the reference diode includes the step of sensing the output of a second diode arranged in thermal association with the reference diode and the converting of the sensed temperature of the reference diode includes the step of converting the output of the second diode by an analog-to-digital converter.

6. A method as set forth in claim 1 and including the further step of supplying a digital input to the digital computer to be used in computing the digital output.

7. A mehtod as set forth in claim 6 and including the further step of storing in a non-volatile memory the characterization equation to be used by the digital computer in computing the digital output.

8. A method as set forth in claim 7 wherein the characterization equation is in the form of Output= f(D,M) where D—digital data and M is the digital temperature representation in the form of M=f(temperature).

9. A method as set forth in claim 7 wherein the digital input is a digital pressure representation from a pressure transmitter.

10. A combination comprising
    a temperature sensitive digital-to-analog system,
    temperature measuring means for producing a digital representation of a temperature affecting said digital system,
    memory means for storing a characterization equation which is a function at least in part of the temperature affecting the digital system,
    digital computer means for computing a digital output in accordance with said characterization equation,
    first means for applying said digital representation of a temperature to said computer means to be used in computing said digital output and
    second means for applying said digital output as an input to said digital system.

11. A combination as set forth in claim 10 wherein said characterization equation is in the form of Output=f(D,M) where D=digital data and M—f(temperature).

12. A combination as set forth in claim 10 wherein said temperature measuring means including a diode arranged to sense a temperature affecting said digital system and an analog-to-digital converter for converting an output signal from said diode into said digital representation of the temperature.

13. A combination as set forth in claim 10 wherein said digital computer means includes an input means for supplying a digital data input to be used in computing said digital output.

14. A combination as set forth in claim 10 wherein said digital-to-analog converter system includes a reference diode means having an output affected by said temperature and said compensating means includes a second diode in thermal association with said reference diode to produce an output signal affected by said temperature.

15. A combination as set forth in claim 14 wherein said compensating means includes an analog-to-digital converter for converting an output signal from said second diode into said digital representation of said temperature.

16. A combination as set forth in claim 15 wherein said memory means is a non-volatile memory means.

17. A combination as set forth in claim 16 wherein said characterization equation is in the form of Output=f(d,M) where D=digital data and M=f(temperature).

18. A combination as set forth in claim 17 wherein said computing means includes data input means for supplying said digital data.

* * * * *